July 30, 1968  L. COHEN  3,395,296
DYNAMOELECTRIC MACHINE MOUNTING WITH REDUCED STATER VIBRATION
Filed Oct. 1, 1965  2 Sheets-Sheet 1

INVENTOR.
LEO COHEN
BY Woodling, Krost,
Granger and Rust
ATTORNEYS

July 30, 1968  L. COHEN  3,395,296
DYNAMOELECTRIC MACHINE MOUNTING WITH REDUCED STATER VIBRATION
Filed Oct. 1, 1965  2 Sheets-Sheet 2

INVENTOR.
LEO COHEN
BY Woodling, Krost,
Granger and Rust
ATTORNEYS

United States Patent Office 3,395,296
Patented July 30, 1968

3,395,296
DYNAMOELECTRIC MACHINE MOUNTING WITH REDUCED STATOR VIBRATION
Leo Cohen, Cleveland, Ohio, assignor to Reliance Electric and Engineering Company, a corporation of Ohio
Filed Oct. 1, 1965, Ser. No. 492,232
12 Claims. (Cl. 310—51)

The invention relates in general to dynamoelectric machine mountings and more particularly to a mounting for electromagnetic apparatus to minimize vibration transmission of the apparatus to the support structure.

This mounting may be used in dynamoelectric machines such as quiet motors where a minimum of noise and vibration transmission is required. In typical alternating current motor construction there is a laminated stator core which is a stack of angular laminations magnetically cooperating with the rotor. This stack of stator laminations is typically secured by a press or shrink fit into the longitudinal central section of the outer frame. This outer frame typically is generally a hollow cylinder having open ends which are closed with end bells, plates, or end brackets. The rotor shaft is journalled in these end brackets.

The prior art attempts at making a quiet motor or one with minimum vibration transmission has been in part to stiffen this outer frame and the end brackets. This has the effect of raising the frequency of natural vibration of the outer frame in a radial direction, and is effective in partially reducing vibrations over a more limited frequency range than the structure of this invention. The vibration in an electric motor is primarily in a plane normal to the motor axis and hence radial with respect to the axis of the stator core and outer frame. The vibration of the stators in such electric motors, both regular motors and the prior art quiet motors, was transmitted directly to the outer frame and from it to the mounting feet or flange mounting at one end and directly to the support structure. In alternating current motors designed to operate at 60 cycles, which is a common commercial frequency, this radial vibration has a fundamental frequency of 120 cycles per second. In the prior art motors this was found to be transmitted directly to the support structure and this was in many cases undesirable especially for precision grinders and other machine tools and the like.

Accordingly an object of the invention is to obviate the above mentioned disadvantages.

Another object of the invention is to provide an exceptionally quiet and vibration free electric motor structure in its mounting plane.

Another object of the invention is to provide a mounting for the stator of an electric motor which permits the stator to vibrate with even greater freedom than normal, yet less of this vibration is transmitted to the mounting for the motor than is the case on ordinary motors.

Another object of the invention is to provide a sub-frame within an outer frame in a motor with the sub-frame carrying the stator and this sub-frame minimizing the transmission of vibration to the outer frame.

Another object of the invention is to minimize longitudinal vibration generated in a motor being transmitted to the outer frame.

Another object of the invention is to provide a stator mounting for an electric motor which divides the radial vibration forces into two parts and transmits the forces to the outer frame at places located near the end brackets whereat the outer frame is inherently much more rigid than at its longitudinal center.

Another object of the invention is to provide a vibration minimizing mounting for an electric motor stator which has simplicity and ease of manufacture, is compact, and may be of all metal construction.

The invention may be incorporated in a machine having vibration and having an outer frame with a hollow annular shell between first and second end plates substantially closing the ends of the shell and a stator cooperating with a rotor on a shaft journalled in the end plates, a sub-frame including first, second, and third parts, said third part extending longitudinally between said first and second parts, said third part at its longitudinal center being more flexible radially than torsionally about the shaft axis, means to fasten said first part to the outer frame near the first end plate, said second part closely abutting the outer frame near the second end plate, and means to fixedly attach said third part near the longitudinal center thereof to the stator, whereby radial vibrations of the stator are imparted to said third part and then transmitted by the sub-frame to the outer frame closely adjacent the two end plates of the outer frame whereat the radial rigidity thereof is many times higher than that of the longitudinal center of the outer frame to thus minimize the amplitudes of such radial vibrations in the outer frame.

Other objects and a fuller understanding of the invention may be had by referring to the following description and claims, taken in conjunction with the accompanying drawings, in which:

Figure 1:
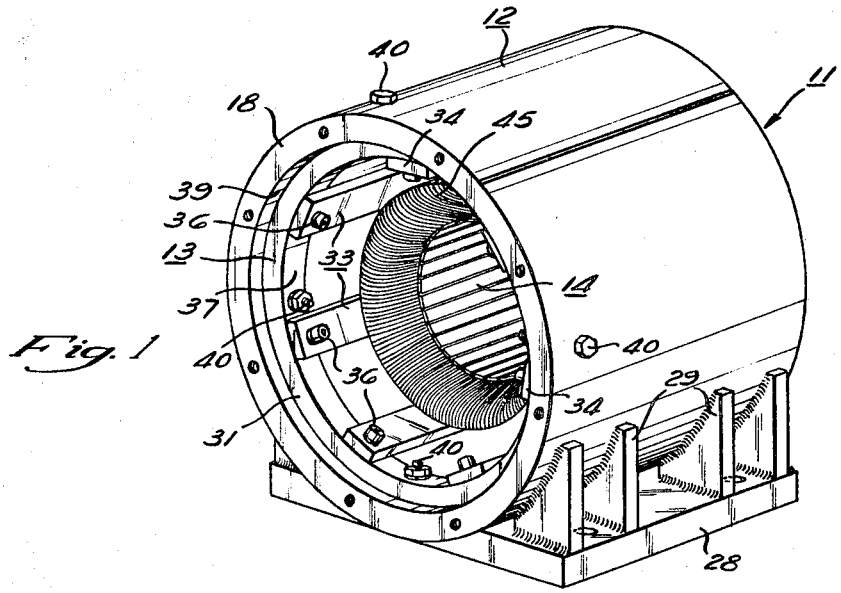
FIGURE 1 is an isometric view of an electric motor incorporating the invention, with the end brackets and rotor removed.
Figure 2:
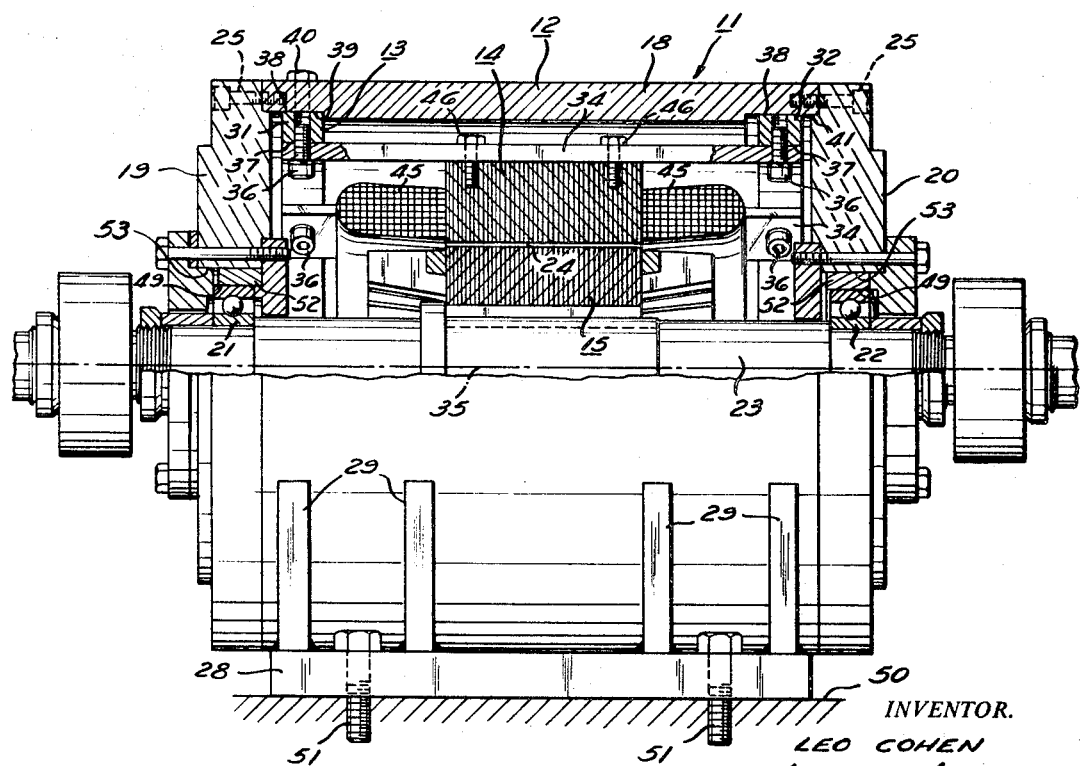
FIGURE 2 is an enlarged longitudinal sectional view through a motor embodying the invention.
Figure 3:
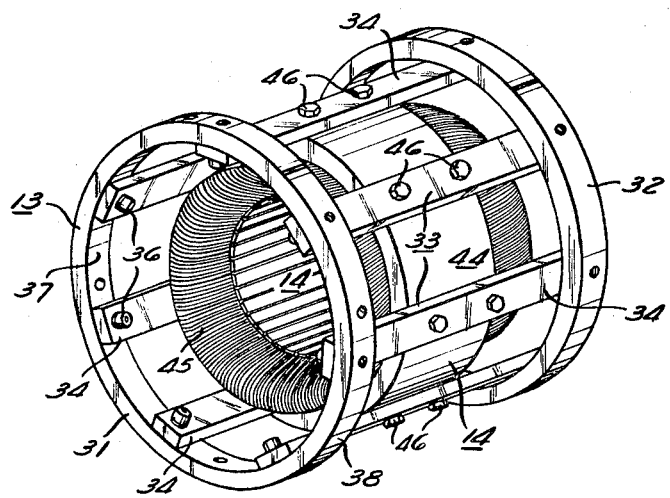
FIGURE 3 is an isometric view of the stator and sub-frame assembly as removed from the outer frame; and, FIGURE 4 is an enlarged partial longitudinal sectional view showing a modification to the end rings.

The FIGURES 1 to 3 show a preferred embodiment of the invention but this illustration of a preferred embodiment is only to illustrate one form which the invention may take and the invention is limited only by the hereinafter appended claims.

The invention may be incorporated in electromagnetic apparatus such as rotating apparatus and has been illustrated for use with an electric motor 11. This electric motor may be for use on alternating current or on direct current and in this preferred embodiment an alternating current induction motor has been shown. The motor 11 includes generally an outer frame 12, a sub-frame 13, a stator 14, and a rotor 15. More particularly the outer frame 12 includes a generally annular shell 18 and first and second end brackets 19 and 20 respectively. These end brackets may be called end bells or end plates. The end brackets 19 and 20 carry bearings 21 and 22 which journal a shaft 23. The rotor 15 is fixedly attached on the shaft 23 in any suitable manner. The rotor magnetically cooperates with the stator 14 through a small radial air gap 24. The end brackets 19 and 20 may be bolted in the usual manner as by machine screws 25 to the annular shell 18 to form the outer frame assembly 12.

A base plate 28 of dimensions approximating the motor in plan view may be welded to one side of the annular shell 18. Heavy reinforcing gussets 29 may be welded between the annular shell and the base plate to rigidly secure the base plate to the annular shell 18.

The sub-frame 13 includes generally first, second, and third parts 31, 32, and 33 respectively. The first and second parts are preferably annular rings. The third part 33 extends longitudinally between and connects to the first and second parts 31 and 32. In this preferred embodiment the third part 33 includes a plurality of bars 34. These bars for simplicity of manufacture and assembly may be rectangular in cross section and of uniform cross section throughout the length thereof. These bars may be of a length approximately the same as the length of the annular shell 18. The bars 34 are of a given number which is preferably a prime number in order to avoid numbers such as two, four, six, and eight and the like which would tend to establish a couple because of the magnetic vibration in a radial plane. Also the numbers three and nine should preferably be avoided especially where the alternating current motor is to be used on a three phase power supply to avoid any similarity between the suspension and the phases of operation which might introduce a vibration because of this symmetry. Accordingly the numbers five, seven, eleven, thirteen, etc. are preferred with seven bars being shown in the preferred embodiment. These bars are preferably symmetrically spaced around the periphery and extend parallel to the motor axis 35.

Each bar is attached at each end to the corresponding ring and this may be done by cap screws 36. The bars are attached to the inner periphery 37 of the rings and the outer periphery 38 of the rings is designed to be received in a sliding fit in a recess 39 near the outer ends of the frame. The first ring 31 is designed to be fixedly fastened to the first end of the outer frame 12. This may be accomplished by four bolts 40. These bolts may be symmetrically placed except for one which may be moved ten degrees off its symmetrical position in order to avoid one of the bars 34. The second ring 32 is also disposed in a recess 41 at the other end of the outer frame 12. This ring 32 is designed to have a longitudinal sliding fit, namely a slip fit with the outer frame 12 but is preferably not attached to the outer frame 12 in any way. It may be bolted to the outer frame just as ring 31 is bolted to the outer frame but it has been found to be an improvement in minimizing transmission of vibration if one of these rings is not fixedly attached to the outer frame.

The stator 14 may be of usual form including a stack of laminations 44 which are riveted or otherwise secured together to form the stack. The usual stator winding 45 may be employed in slots in the stator 14. The stator 44 may be secured to the bars 34 at the longitudinal central span or section thereof by having holes drilled radially and tapped in the outer periphery of the stator 14 and having cap screws 46 passing through apertures in the bars 34 and into the tapped holes in the stator 14.

The outside diameter of the bearings 21 may also have a slip fit in an aperture 49 which comprises the inner diameter of a bearing sleeve 52 that slips into an aperture 53 in the end brackets 19 and 20 since it has not been found necessary to provide an interference fit at this point in order to minimize vibration. Also as previously stated a slip fit is provided between the rings 31 and 32 and the recesses 39 and 41 respectively, because it has not been found necessary to provide an interference fit at these or any other locations in the motor assembly. The complete motor may be mounted to a support 50 by any usual means such as bolts 51 passing through the base plate 28 into the support 50.

OPERATION

The motor 11 has been found to be exceptionally quiet audibly in operation but has been even more successful in minimizing the transmission of vibration inherent in the operation of the motor 11 to the support 50. The motor 11 has inherent vibrations predominantly in a radial direction which is in a plane normal to the axis 35. This vibration is caused in part by mechanical unbalance so that the most accurate balancing does not eliminate the vibration, which is primarily caused by periodic magnetic attraction between the stator and rotor due to the rotating field and by magnetostriction. Because of the one or more pairs of revolving poles in the stator 14 there is a radial vibration established in this stator which normally is transmitted through the outer frame 12 to the support 50. With operation at 60 cycles per second, which is a usual operating frequency, the magnetic vibration has a fundamental frequency of 120 cycles per second. The sub-frame 13 is designed to permit the stator 14 to vibrate radially but to minimize the transmission of vibrations to the outer frame 12 and hence the support 50. In one actual case, each individual bar 34 is sixteen inches long, two inches wide and one-half inch thick. This is for use with a fifty horsepower two pole motor in an electrical design of frame size equal to a No. 320 frame size diameter and with an outer frame envelope dimension equal to a No. 360 frame size diameter. The annular shell 18 is seventeen inches long and eighteen inches in outside diameter. The sub-frame 13 is sixteen inches in outside diameter and sixteen inches long, the length of the bars 34. It will be noted that these bars are thin in the radial dimension relative to the peripheral or circumferential direction. Accordingly the bars individually are relatively more flexible in the radial direction than in the circumferential direction. The plurality of bars as a group, in this case seven in number, are designed to act as a group to have a given lateral stiffness to rigidly support the stator 14. This lateral stiffness is required in order to maintain the uniformity of the air gap 24 between the stator and rotor.

In one actual example the bars 34 as a group were designed to have a natural frequency of vibration of 180 cycles per second. This frequency was chosen to be higher than the fundamental frequency of 120 cycles per second of the radial vibrations of the stator core 14. If a frequency below 120 cycles per second were chosen for the natural vibration frequency of the group of bars 34, the lower frequency could possibly be disadvantageous since it would be within the range of the frequency of rotation and the fundamental frequencies of bearing vibration. If some frequency higher than 180 cycles per second were chosen the bars would become too thick in a radial direction. In comparison the outer frame of regular electric motors of this size might have a natural frequency of vibration of about 500 to 600 cycles per second in the longitudinal central section of such outer frame. This would be motors of the type wherein the stator 14 was directly press or shrink fitted into the outer frame 12. In the prior art attempt at making a quiet motor, the usual attempt has been to thicken the outer frame 12. This is of limited benefit because the stiffness of this outer frame increases only in proportion to the first order of the thickness.

FIGURE 3 best illustrates the fact that the individual bars 34 may have considerable radial flexibility; however, these seven bars acting as a group will have considerable stiffness transverse to the axis 35. For example assume a vibration force acting vertically at a given instant on the stator 14. This force would be resisted by the top and bottom bars with these bars acting as flexible beams and the force being transverse to the thickness dimensions of these bars. Because the bars are thin in this dimension these bars would flex in the direction of the applied force. However the remaining bars on the sides of the sub-frame 13 will be stressed in a direction more nearly parallel to their two inch side dimension. In this direction the bars will be considerably stiffer so as to provide an assembly that will maintain airgap uniformity within conventional limits, which have been found to be adequate to attain the low vibration signatures claimed.

In any motor the vibration force applied to the support 50 is equal to the product of the mass of the motor by the acceleration generated, at the frequency of interest. Since the mass of the motor is known the vibration force at any frequency may be determined by measuring the acceleration $a$ of the motor when it is resiliently supported. The application of this invention to conventional electrical designs results in reductions of as much as 25 to 1 in the forces transmitted through the mounting plane of the motor to the support structure 50 at 120 cycles per second, and in reductions of comparable magnitude in the frequency range to 10,000 cycles per second.

The fact that one end ring 32 is not fastened to the outer frame 12 is helpful in several ways. As each bar 34 vibrates radially it will also vibrate longitudinally. By having only one of the rings fastened to the outer frame 12, the longitudinal vibrations induced in the rings either by the radial or lateral vibration of the bars 34 secured to them are prevented from being transmitted to the outer frame 12. Still further this construction prevents transmission to the outer frame 12 of stresses induced by lengthwise distortions or movements of the stator core. These might be either steady-state or transient, of the stator 14 or bars 34 or both, due to thermal differentials or other sources. In addition torsional vibrations are partially damped.

The outer frame 12 is considerably thicker than that in usual motor construction and is quite stiff radially compared to the radial stiffness of the individual bars 34. The net result is that the radial vibration of the stator 14 acts on each individual bar 34 allowing each bar to vibrate radially relatively freely while all bars as a group are relatively stiff laterally to maintain the stator 14 in alignment with the rotor 15. Another important advantage is that these radial vibration forces are divided into two generally equal parts, with these forces transmitted radially at the two rings 31 and 32. Thus the force at each of the two rings is only about half what it is at the longitudinal center of the stator 14. The further important result is that these radial vibration forces are transmitted to the outer frame 12 at a location very closely adjacent to the end brackets 19 and 20. Because these end brackets are substantially solid plates, they are very stiff in a radial direction and many times stiffer than the central section of an ordinary motor frame or even of the outer frame 12. Accordingly these end brackets 19 and 20 are able to reduce the vibrating motion produced by these vibration forces resulting in a proportional reduction in the vibrating motion transmitted to the motor support 50.

Another benefit is that this stator mounting greatly reduces the likelihood of the rotor rubbing on the stator at the air gap 24 if the machine is subjected to mechanical shock loading transverse to the axis 35, since the elastically supported stator 14 permits some relative lateral motion between the stator 14 and the outer frame 12 and has approximately the same order of elasticity as the rotor and shaft 23. Snubbers may be provided to limit the lateral motion of the core in the frame under shock loading.

The base plate 28 is thick and stiff and it is effective primarily at frequencies above 1000 cycles per second. The sub-frame 13 is primarily effective at frequencies below 1000 cycles per second.

The motor 11 has been illustrated as foot mounted. The minimum vibration mounting disclosed in this invention is also equally applicable for flange mounted motors. The usual flange mounting arrangement may be used and is a radial enlargement of one end bracket 20 with the motor mounted in the vertical attitude. In this case the bearing 21 which is locked in place should be the bearing opposite the flange end of the motor. The ring 31 which is bolted to the outer frame 12 should also be at the end remote from the flange mounting. This will minimize transmission of vibrations to the support 50 to which the flange mounting is attached.

The motor 11 has been illustrated as an alternating current motor and the same type of mounting may be used with a direct current motor. In such cases the stator or stator assembly may be considered to be the full complement of main poles and interpoles installed in a field ring or frame ring of conventional construction and may also include rigid support for the commutator brush rigging.

This assembly is then supported in the sub-frame 13 which in turn is mounted in the outer frame 12.

Figure 4:
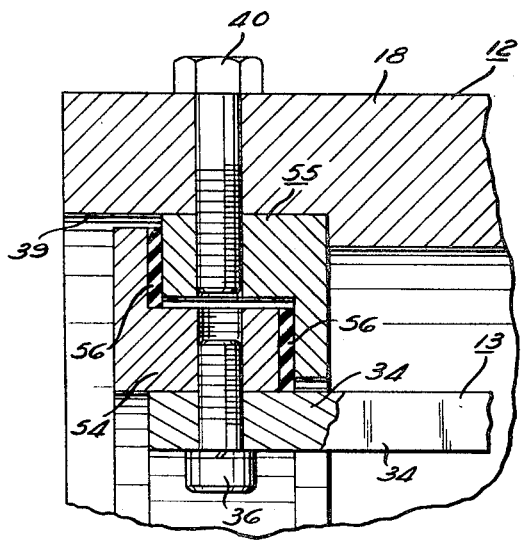

FIGURE 4 illustrates a modification which may be incorporated in the mounting. This FIGURE 4 shows a part of the annular shell 18 of the outer frame 12. A bar 34 is shown bolted by a cap screw 36 to the inside diameter of an L-section ring 54. An outer ring 55 also with an L-section is bonded on two parallel sides only to the ring section 54 by an elastomer 56. The outside diameter of the outer ring 55 is machined, as by grinding, to a predetermined outside diameter to be received in a slip fit in the recess 39 in the annular shell 18. The ring 55 is in turn bolted by the bolts 40 to this annular shell 18. This modification of FIGURE 4 then introduces an elastomer in the mounting of the sub-frame 13 to the outer frame 12 to still further reduce transmission of vibrations. In the preferred embodiment of FIGURES 1 to 3 an all metal construction is used. Slip fits are used rather than the more costly construction of interference fits which is often used in the prior art quiet motors.

The minimum vibration transmission mounting of the present invention provides a quiet dynamoelectric machine which may be simply and economically constructed and of minimum weight compared to prior art quiet machines. It is also compact in size compared to other quiet machines or motors and is readily applicable to small machines as well as large machines. The slip fit construction permits the motor to be readily disassembled in the field should this be necessary which is a very definite advantage for motors located all over the world.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. In a machine having vibration and having an outer frame with a hollow annular shell between first and second end plates substantially closing the ends of the shell and a stator cooperating with a rotor on a shaft journalled in the end plates,
   the improvement of a mounting for the stator, comprising, in combination,
   a sub-frame including first, second and third parts,
   said third part extending longitudinally between said first and second parts,
   said third part at its longitudinal center being more flexible radially than torsionally about said axis,
   means to fasten said first part to the outer frame near the first end plate, said second part closely abutting the outer frame near the second end plate,
   and means to fixedly attach said third part near the longitudinal center thereof to the stator,
   whereby radial vibrations of the stator are imparted to said third part and then transmitted by the sub-frame to the outer frame closely adjacent the two end plates of the outer frame whereat the radial rigidity thereof is many times higher than that of the longitudinal center of the outer frame to thus minimize the amplitudes of such radial vibrations in the outer frame.

2. In electromagnetic apparatus having a stator with an axis and subject to vibration in any given plane normal to said axis,
   the improvement of a low vibration-transmission mounting for the stator, comprising in combination,
   an outer frame including a hollow annular shell extending between first and second end plates substantially closing the two ends of said shell and each disposed substantially normal to said axis,
   a sub-frame including first, second, and third parts, said third part having a longitudinal central span including a plurality of discrete longitudinally extending portions substantially parallel to said axis, said third part longitudinal central span having a cross-sectional shape which is more flexible in said given plane than circumferentially about the axis, means to fixedly attach said longitudinal central span of said third part to the stator with said stator axis substantially parallel to said longitudinally extending portion, means to fasten said first part to said outer frame near said first end plate, and said second part closely abutting said outer frame near said second plate, whereby vibrations of the stator assembly in said given plane are imparted to said third part and then transmitted by the sub-frame to the outer frame closely adjacent the two end plates of the outer frame whereat the radial rigidity thereof is many times higher than that of the longitudinal central section of the outer frame to thus minimize the amplitudes of such vibrations in the outer frame.

3. In a dynamoelectric machine having an outer frame with an annular shell between end brackets and a stator assembly cooperating with a rotor on a shaft journalled in the end brackets about an axis, the improvement of a mounting for the stator assembly, comprising, in combination, a sub-frame including first, second, and third parts, said third part longitudinally extending between said first and second parts, said third part having a longitudinal central span which is more flexible radially than torsionally about said axis of rotation and which is more flexible radially than the annular shell, said first and second parts being substantially annular, means to fasten said first part to the outer frame near the first end bracket, said second part closely abutting the outer frame near the second end bracket, and means to fixedly attach said longitudinal central span of said third part to the stator assembly, whereby radial vibrations of the stator assembly are imparted to said third part and then transmitted by the sub-frame to the outer frame closely adjacent the two ends of the outer frame whereat the radial rigidity thereof is many times higher than that of the longitudinal central span of the outer frame to thus minimize the amplitudes of such radial vibrations in the outer frame.

4. In a dynamoelectric machine having an outer frame with an annular shell between end brackets and a stator assembly cooperating with a rotor on a shaft journalled in the end brackets about an axis, the improvement of a mounting for the stator assembly, comprising, in combination, a sub-frame including first, second, and third parts, said third part longitudinally extending between said first and second parts, said third part having a longitudinal central span with a cross-sectional shape which is more flexible radially than circumferentially about the axis of rotation, means to fasten said first part to the outer frame near the first end bracket, said second part abutting the outer frame near the second end bracket, and means to fixedly attach said longitudinal central span of said third part to the stator assembly, whereby radial vibrations of the stator assembly are imparted to said third part and then transmitted by the sub-frame to the outer frame closely adjacent the two ends of the outer frame whereat the radial rigidity thereof is many times higher than that of the longitudinal central section of the outer frame to thus minimize the amplitudes of such radial vibrations in the outer frame.

5. In a dynamoelectric machine having an outer frame with an annular shell between end brackets and a stator assembly cooperating with a rotor on a shaft journalled in the end brackets about an axis, the improvement of a low vibration-transmission mounting for the stator assembly, comprising, in combination, a sub-frame including first, second, and third parts, said third part having a longitudinal central span including a plurality of discrete longitudinally extending portions, said third part longitudinal central span having a cross-sectional shape which is more flexible radially than circumferentially about the axis of rotation of the machine, said first and second parts being substantially annular and substantially stiffer in a radial direction than said longitudinal central span of said third part, means to fasten said first part to the outer frame near the first end bracket, said second part closely abutting the outer frame near the second end bracket, and means to fixedly attach said longitudinal central span of said third part to the stator assembly, whereby radial vibrations of the stator assembly are imparted to said third part and then transmitted by the sub-frame to the outer frame closely adjacent the two ends of the outer frame whereat the radial rigidity thereof is many times higher than that of the longitudinal central section of the outer frame to thus minimize the amplitudes of such radial vibrations in the outer frame.

6. In a dynamoelectric machine having an outer frame with an annular shell between end brackets and a stator assembly cooperating with a rotor on a shaft journalled in the end brackets about an axis, the improvement of a low vibration-transmission mounting for the stator assembly, comprising, in combination, a sub-frame including first, second, and third parts, said first and second parts being annular, said third part having a longitudinal central span including a plurality of discrete longitudinally extending portions, said third part longitudinal central span having a cross-sectional shape which is more flexible radially than circumferentially about the axis of rotation of the machines, means to fasten only said first part to the outer frame near the first end bracket and to leave said second part unfastened with a longitudinally sliding fit with the outer frame near the second end bracket, and means to fixedly attach said longitudinal central span of said third part to the stator assembly, whereby radial vibrations of the stator assembly are imparted to said third part and then transmitted by the sub-frame to the outer frame closely adjacent the two ends of the outer frame whereat the radial rigidity thereof is many time higher than that of the longitudinal central section of the outer frame to thus minimize the amplitudes of such radial vibrations in the outer frame.

7. In a dynamoelectric machine having an outer frame with end brackets and a stator assembly cooperating with a rotor on a shaft journalled in the end brackets about an axis, the improvement of a low vibration-transmission mounting for the stator assembly, comprising, in combination, a sub-frame including first, second, and third parts, said first and second parts being first and second annular rings, said third part having a cross-sectional shape which is more flexible radially than circumferentially about the axis of rotation of the machine, means to fasten only said first part to the outer frame near the first end bracket and to leave said second part unfastened with a longitudinally sliding fit with the outer frame near the second end bracket, and means to fixedly attach the longitudinal central span of said third part to the stator assembly, whereby radial vibrations of the stator assembly are imparted directly to said third part and the several radial forces transmitted by the sub-frame to the outer frame are divided into two parts which act on the outer frame at points closely adjacent the two ends of the outer frame whereat the radial rigidity thereof is many times higher than that of the longitudinal central span of the outer frame to thus minimize the amplitudes of such radial vibratory vibratory motions in the outer frame.

8. In an electric motor having an outer frame with an annular shell between end brackets and a stator assembly cooperating with a rotor on a shaft journalled in the end brackets about an axis, the improvement of a low vibration-transmission mounting for the stator assembly, comprising, in combination, a sub-frame including first, second, and third parts, said first and second parts being first and second annular rings, said third part being a plurality of bars longitudinally extending from one ring to another and fastened thereto, said third part having a cross-sectional shape which is more flexible radially than circumferentially about the axis of rotation of the motor, said sub-frame having a slip fit with an inner circumferential surface at each end of the outer frame, means to fasten only said first part to the outer frame near the first end bracket and to leave said second part unfastened with a longitudinally sliding fit with the outer frame near the second end bracket, and means to fixedly attach the longitudinal central section of said third part to the stator assembly, whereby radial vibrations of the stator assembly are imparted directly to said third part and the radial forces transmitted by the sub-frame to the outer frame are divided into two parts which act on the outer frame at points closely adjacent the two ends of the outer frame whereat the radial rigidity thereof is many times higher than that of the longitudinal central section of the outer frame to thus minimize the amplitudes of such radial vibratory motions in the outer frame.

9. In an electric motor having an outer frame with end brackets and a stator assembly cooperating with a rotor on a shaft journalled in the end brackets about an axis, the improvement of a mounting for the stator assembly, comprising, in combination, a sub-frame including first and second rings and a plurality of longitudinal bars, each of said first and second rings being annular rings and having inner and outer peripheral surfaces, said plurality of bars longitudinally extending from one ring to another and fastened thereto on the inner peripheral surfaces, said bars having a cross-sectional shape which is more flexible radially than circumferentially about the axis of rotation of the motor, said outer peripheral surfaces of said rings having a slip fit with an inner circumferential surface at each end of the outer frame, means to fasten only said first ring to the outer frame near the first end bracket and to leave said second ring unfastened with a longitudinally sliding fit with the outer frame near the second end bracket, and means to fixedly attach the longitudinal central sections of all of said bars to the stator assembly, whereby radial vibrations of the stator assembly are imparted directly to said longitudinal bars and the radial forces transmitted by the bars and rings to the outer frame are divided into two parts which act on the outer frame closely adjacent the two ends of the outer frame whereat the radial rigidity thereof is many times higher than that of the longitudinal central section of the outer frame to thus minimize the amplitude of such radial vibratory motions in the outer frame.

10. In an electric motor having an outer frame with end brackets and a stator assembly cooperating with a rotor on a shaft journalled in the end brackets about an axis, the improvement of a mounting for the stator assembly, comprising, in combination, a sub-frame including first and second rings and a plurality of longitudinal bars, each of said first and second rings being annular rings, said plurality of bars being a prime number and longitudinally extending from one ring to another and fastened thereto, said bars and said sub-frame being substantially as long as the outer frame to have said bars extend close to the end brackets, said bars being rectangular in cross section and more flexible radially than circumferentially about the axis of rotation of the motor, said sub-frame having a slip fit with an inner circumferential surface at each end of the outer frame, means to fasten only said first ring to the outer frame near the first end bracket and to leave said second ring unfastened with a longitudinally sliding fit with the outer frame near the second end bracket, and means to bolt the longitudinal central section of all of said bars to the stator assembly, whereby radial vibrations of the stator assembly are imparted directly to said longitudinal bars and the radial forces transmitted by the bars and rings to the outer frame are divided into two parts which act on the outer frame at points closely adjacent the two ends of the outer frame whereat the radial rigidity thereof is many times higher than that of the longitudinal central section of the outer frame to thus minimize the amplitudes of such radial vibratory motions in the outer frame.

11. A low vibration electric motor comprising, in combination, a hollow cylindrical outer frame, means on said frame to mount the motor on a support, first and second end brackets on opposite ends of said cylindrical frame and stiffening said frame thereat in a radial direction, a sub-frame in said outer frame comprising first and second rings and a plurality of longitudinal bars, each of said first and second rings being annular rings, said plurality of bars being an odd prime number and longitudinally extending from one ring to another and bolted thereto, said bars and said sub-frame being substantially as long as said outer frame to have said bars extend close to said end brackets, said bars being substantially rectangular in cross section and thinner in the radial direction than in the circumferential direction, said sub-frame having a slip fit with an inner circumferential surface at each end of said outer frame, means to fixedly fasten only said first ring to said outer frame near said first end bracket and to leave said second ring unfastened with a longitudinally sliding fit with said outer frame near said second end bracket, a laminated stator core including a stack of annular laminations to which is bolted each of said longitudinal bars near the center thereof, bearings carried in said first and second end brackets, a shaft journalled in said bearings, and a laminated rotor fixed on said shaft and magnetically cooperating with said laminated stator core whereby said stator core has radial vibrations caused by the periodic magnetic attraction between said rotor and stator with said radial vibrations imparted directly to said longitudinal bars and the radial forces transmitted by the bars and rings to the outer frame in two parts which act on the outer frame at points closely adjacent the two ends of the outer frame whereat the radial rigidity thereof is many times higher than that of the longitudinal central section of the outer frame of thus minimize the amplitudes of such radial vibratory motions in the outer frame.

12. A low vibration electric motor comprising, in combination, a hollow cylindrical outer frame, mounting feet on said frame to mount the motor on a support, first and second end bells on opposite ends of said cylindrical frame and stiffening said frame thereat in a radial direction, a sub-frame in said outer frame comprising first and second rings and a plurality of longitudinal bars, each of said first and second rings being circular on their outer periphery, said plurality of bars being seven in number and longitudinally extending from one ring to another and bolted thereto, said bars and said sub-frame being substantially as long as said outer frame to have said bars extend close to said end bells, said bars being rectangular in cross section and wider in the circumferential direction than in the radial direction for greater torsional rigidity and radial flexibility referred to the axis of rotation of the motor, said sub-frame having a slip fit with an inner circumferential surface at each end of said outer frame, means to bolt only said first ring to said outer frame near said first end bell and to leave said second ring unfastened with a longitudinally sliding fit with said outer frame near said second end bell, a laminated stator core including a stack of annular laminations to which is bolted each of said longitudinal bars near the longitudinal center thereof, bearings carried in said first and second end bells, a shaft journalled in said bearings, and a laminated rotor fixed on said shaft and magnetically cooperating with said laminated stator core whereby said stator core has radial vibrations caused by the periodic magnetic attraction between said rotor and stator with said radial vibrations imparted directly to said longitudinal bars and the radial forces transmitted by the bars and rings to the outer frame in two parts which act on the outer frame at points closely adjacent the two ends of the outer frame whereat the radial rigidity thereof is many times higher than that of the longitudinal central section of the outer frame to thus minimize the amplitudes of such radial vibratory motions in the outer frame.

References Cited

UNITED STATES PATENTS

| 2,039,456 | 5/1936 | Sammarone | 310—51 X |
| 2,611,797 | 9/1952 | Beckwith et al. | 310—51 |

MILTON O. HIRSHFIELD, *Primary Examiner.*

WARREN E. RAY, *Assistant Examiner.*